(12) United States Patent
Abevi et al.

(10) Patent No.: US 10,041,573 B2
(45) Date of Patent: Aug. 7, 2018

(54) ROLLER SCREW MECHANISM WITH INTEGRATED RING GEARS AND ASSOCIATED MANUFACTURING METHOD

(71) Applicants: Folly Abevi, Chambéry (FR); Christian Boch, Chambéry (FR)

(72) Inventors: Folly Abevi, Chambéry (FR); Christian Boch, Chambéry (FR)

(73) Assignee: AKTIEBOLAGET SKF, Gothenburg (SE)

( * ) Notice: Subject to any disclaimer, the term of this patent is extended or adjusted under 35 U.S.C. 154(b) by 136 days.

(21) Appl. No.: 14/864,936

(22) Filed: Sep. 25, 2015

(65) Prior Publication Data
US 2016/0091068 A1    Mar. 31, 2016

(30) Foreign Application Priority Data
Sep. 29, 2014 (FR) .................... 14 59200

(51) Int. Cl.
*F16H 1/24* (2006.01)
*F16H 55/02* (2006.01)
*F16H 25/22* (2006.01)
*B23F 1/08* (2006.01)

(52) U.S. Cl.
CPC .......... *F16H 25/2252* (2013.01); *B23F 1/08* (2013.01)

(58) Field of Classification Search
CPC .................................................. F16H 25/2252
See application file for complete search history.

(56) References Cited

U.S. PATENT DOCUMENTS

| 4,470,646 A | * | 9/1984 | Fuchsluger | F16C 19/50 384/550 |
| 2002/0134184 A1 | * | 9/2002 | Hawkins | F16H 55/08 74/457 |
| 2010/0170077 A1 | * | 7/2010 | Kinoshita | F16H 25/2252 29/466 |
| 2013/0152716 A1 | * | 6/2013 | Buvril | F16H 25/2252 74/89.23 |

FOREIGN PATENT DOCUMENTS

| EP | 1918612 A1 | 5/2008 |
| EP | 2048412 A1 | 4/2009 |
| JP | 2007162744 A | 6/2007 |

* cited by examiner

*Primary Examiner* — William J Cook
(74) *Attorney, Agent, or Firm* — Bryan Peckjian; SKF USA Inc. Patent Dept.

(57) ABSTRACT

A roller screw mechanism comprising a screw having an outer thread, a nut disposed around and coaxially with the screw. The nut includes an inner thread. A plurality of rollers are disposed radially between the screw and the nut and are each provided with an outer thread engaged with the outer and inner threads of the screw and of the nut and with two outer gear teeth. The mechanism additionally comprises two synchronizing gear teeth that are formed on the nut and are each engaged with one of the gear teeth of the rollers. The root diameter of each gear teeth is less than the inside diameter of the inner thread of the nut.

8 Claims, 8 Drawing Sheets

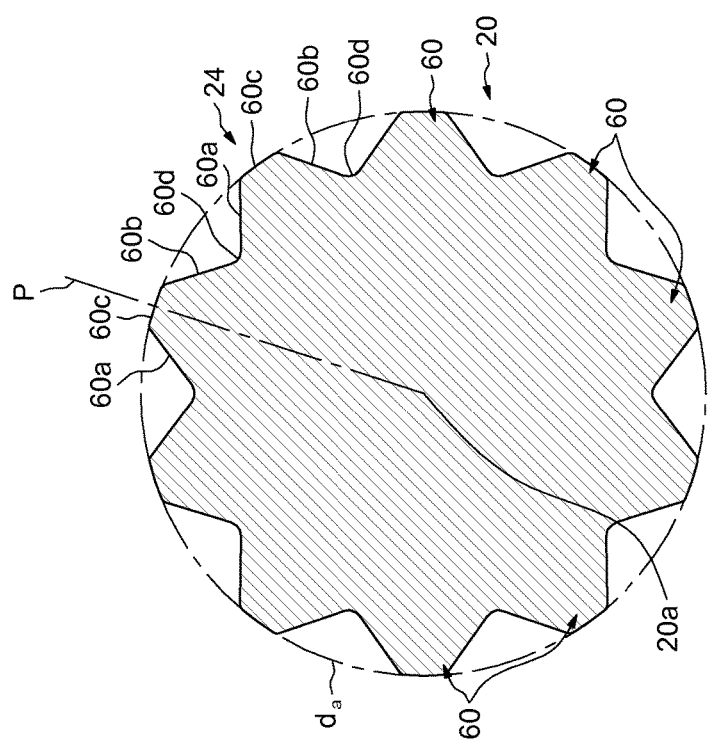

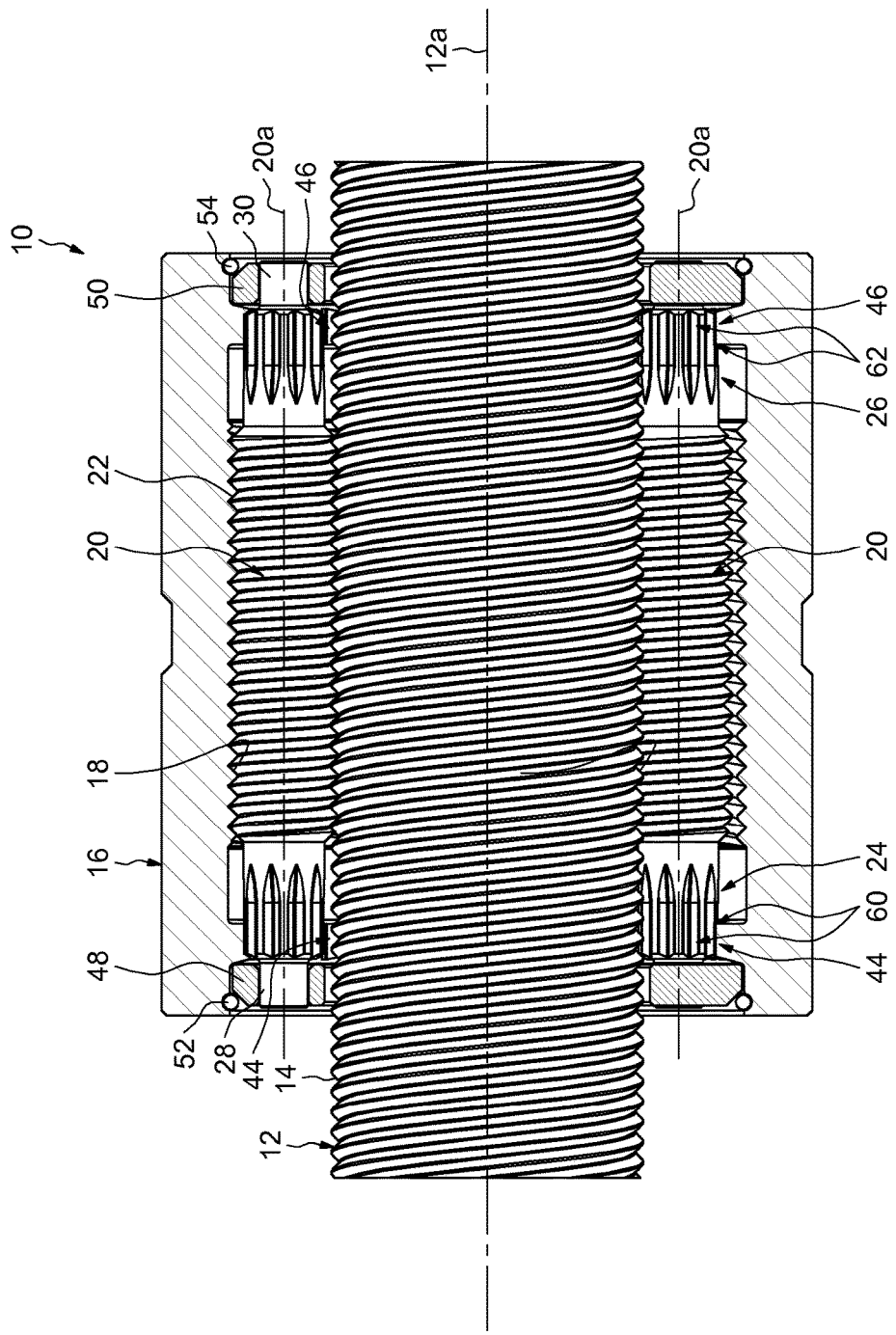

ROLLER SCREW MECHANISM WITH INTEGRATED RING GEARS AND ASSOCIATED MANUFACTURING METHOD

CROSS REFERENCE TO RELATED APPLICATION

This is a Non-Provisional Patent Application, filed under the Paris Convention, claiming the benefit of France (FR) Patent Application Number 1459200, filed on 29 Sep. 2014, which is incorporated herein by reference in its entirety.

FIELD OF THE INVENTION

The present invention relates to the field of roller screw mechanisms for converting a rotational movement into a linear translational movement, and vice versa.

BACKGROUND OF THE INVENTION

Such a mechanism is provided with a screw comprising an outer thread, with a nut disposed around the screw and comprising an inner thread, and with a plurality of longitudinal rollers that have an outer thread engaged with the outer and inner threads of the screw and of the nut.

In a first type of roller screw mechanism, the threads of the rollers and the thread of the nut have helix angles that are identical to one another and different from that of the thread of the screw, such that, when the screw rotates with respect to the nut, the rollers rotate on themselves and roll around the screw without moving axially inside the nut. The rollers are guided in rotation parallel to the axis of the screw by way of ring gears that are fitted in a non-threaded part of the nut and comprise inner synchronizing gear teeth engaged with outer gear teeth of the rollers. Such a mechanism is referred to as a planetary roller screw.

In order to reduce the number of parts to be manufactured and joined together, it is possible to form the inner synchronizing gear teeth directly on the nut, axially on either side of the thread of the nut.

However, with the current design of such mechanisms with gear teeth integrated in the nut, it is necessary to carry out first gear cutting operations in order to form in the bore of the nut one of the gear teeth on one side of the inner thread, then to turn the nut and subsequently carry out second gear cutting operations in this bore in order to form the other gear teeth on the opposite side. This succession of operations substantially increases the cost of manufacturing the nut.

Moreover, with such a method, angular misalignments generally occur between the two inner synchronizing gear teeth formed on the nut. Such misalignments can cause deformations of the rollers of the mechanism, mainly by torsion, or even deterioration of the gear teeth of these rollers.

A second type of roller screw mechanism has a similar operating principle, but differs by way of an inverted disposition. The helix angles of the threads of the rollers, of the screw and of the nut are chosen such that, when the screw rotates with respect to the nut, the rollers rotate on themselves about the screw and move axially in the nut. The rollers are guided in rotation by outer synchronizing gear teeth that are formed on the screw and engage with the gear teeth of the rollers. Such a mechanism is referred to as an inverted roller screw.

In order to manufacture the screw equipped with outer synchronizing gear teeth of such a mechanism, provision is also made of gear cutting operations for example with the aid of two radially acting hobs that are mounted on a common support spindle. The two hobs successively cut the two synchronizing gear teeth on the outer surface of the screw. The time for manufacturing the screw is relatively long. Moreover, during manufacture, angular misalignments of the teeth of one of the outer synchronizing gear teeth of the screw with respect to the teeth of the other gear teeth can occur in this case, too.

SUMMARY OF THE INVENTION

The present invention seeks to overcome these drawbacks.

More particularly, the present invention seeks to provide a roller screw mechanism that is easy to manufacture and has an increased service life.

In one embodiment, the roller screw mechanism comprises a screw comprising an outer thread, a nut disposed around and coaxially with the screw, the nut comprising an inner thread, and a plurality of rollers that are disposed radially between the screw and the nut and are each provided with an outer thread engaged with the outer and inner threads of the screw and of the nut and with two outer gear teeth.

The mechanism also comprises two synchronizing gear teeth that are each engaged with one of the gear teeth of the rollers. When the synchronizing gear teeth are formed on the nut, the root diameter of each gear teeth is less than the inside diameter of the inner thread of the nut. The mechanism is of the planetary roller screw type. The root diameter corresponds to the circle passing through the roots or bases of the teeth of the synchronizing gear teeth. In other words, the root diameter corresponds to the circle passing through the bottom of each tooth gap of the synchronizing gear teeth.

When the synchronizing gear teeth are formed on the screw, the root diameter of each gear teeth is greater than the outside diameter of the outer thread of the screw. The mechanism is of the inverted roller screw type.

Preferably, each tooth of the synchronizing gear teeth comprises flanks that have a convex profile in cross section.

In one embodiment, each tooth of the synchronizing gear teeth formed on the nut comprises a first flank that has a convex profile formed by a first hypocycloid in cross section, and a second flank that has a convex profile formed by a second hypocycloid in cross section.

In another embodiment, each tooth of the synchronizing gear teeth formed on the screw comprises a first flank that has a convex profile formed by a first epicycloid in cross section, and a second flank that has a convex profile formed by a second epicycloid in cross section.

In another embodiment, each tooth of the synchronizing gear teeth formed on the nut or the screw comprises two flanks that each has a convex profile formed by an arc of a circle in cross section.

Each tooth of the gear teeth of the rollers may comprise planar faces that engage with the synchronizing gear teeth. Alternatively, each tooth of the gear teeth of the rollers may comprise faces that have a concave profile in cross section.

The invention also relates to an actuating cylinder comprising a means for driving in rotation and a roller screw mechanism as defined above, the screw of the mechanism being coupled to the driving means.

The invention also relates to a method for manufacturing a nut or a screw of a roller screw mechanism comprising a thread and two gear teeth that are disposed axially on either side of the thread. The method comprises steps of removing material by axial broaching in order to form the two gear teeth in a single axial pass, each of the gear teeth being radially offset with respect to the thread.

According to one method of implementation, the steps of removing material in order to form the two gear teeth are carried out after the steps of removing material in order to form the thread.

BRIEF DESCRIPTION OF THE FIGURES

The present invention will be better understood from reading the detailed description of a number of embodiments which are given by way of entirely non-limiting example and are illustrated by the appended drawings, in which:

FIG. 3 is a view in section on the line III-III in FIG. 2;

FIG. 6 is a view in axial section of a roller screw mechanism according to a second exemplary embodiment of the invention;

DETAILED DESCRIPTION OF THE EMBODIMENTS

Figure 1:
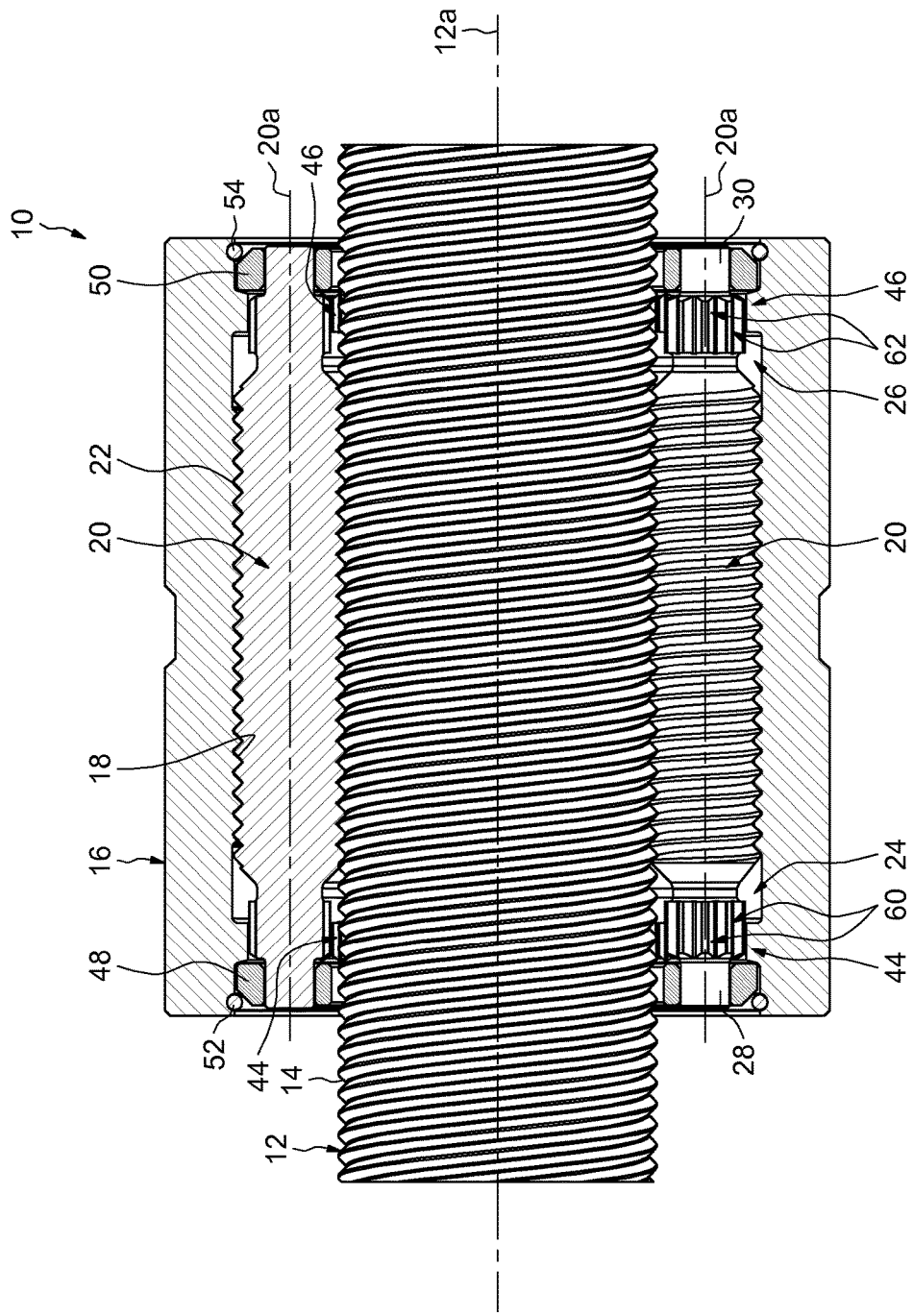
FIG. 1 is a view in axial section of a roller screw mechanism according to a first exemplary embodiment of the invention.

In FIG. 1, the planetary roller screw mechanism 10 comprises a screw 12, of axis 12a, provided with an outer thread 14, a nut 16 mounted coaxially around the screw 12 and provided with an inner thread 18, the inside diameter of which is greater than the outside diameter of the thread 14, and a plurality of longitudinal rollers 20 disposed radially between the screw and the nut. The screw 12 extends longitudinally through a cylindrical bore of the nut 16, on which the inner thread 18 is formed.

The rollers 20 are identical to one another and distributed regularly around the screw 12. Each roller 20 extends along an axis 20a parallel to the axis 12a of the screw and comprises an outer thread 22 engaged with the thread 14 of the screw and the thread 18 of the nut.

Figure 2:
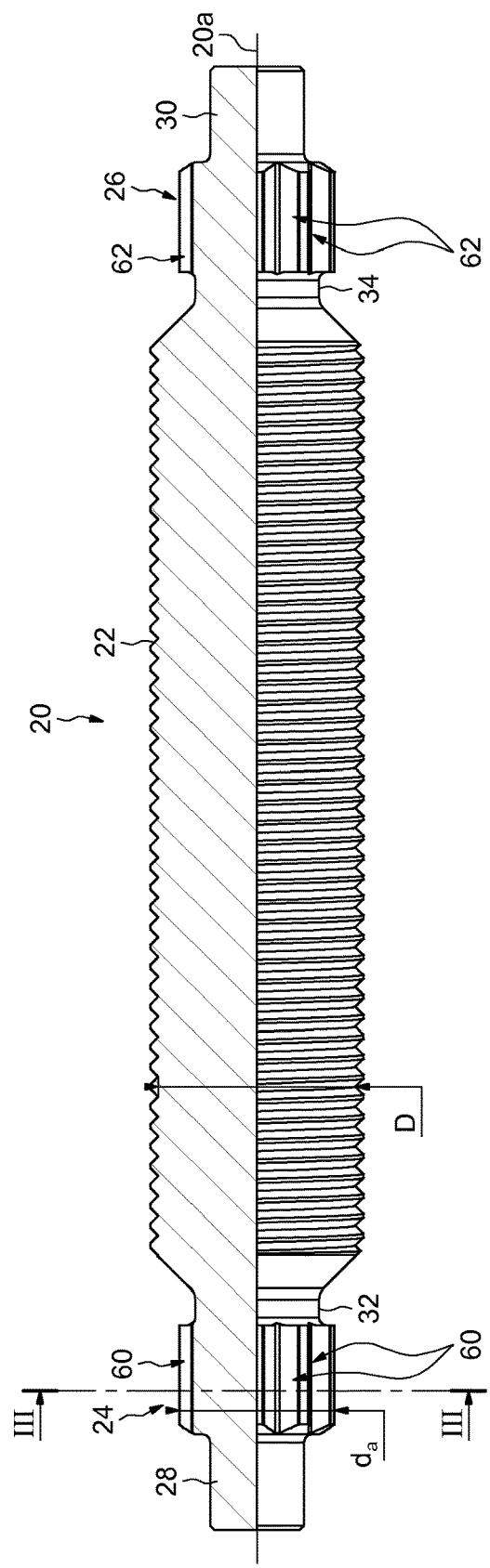
FIG. 2 is a view in half axial section of a roller of the mechanism in FIG. 1.

As illustrated more clearly in FIG. 2, each roller 20 comprises, at each end, an outer gear teeth 24, 26 and a cylindrical journal 28, 30 extending axially towards the outside from the gear teeth. The gear teeth 24, 26 are disposed axially on either side of the outer thread 22. The gear teeth 24, 26 are identical to one another. Each roller 20 also comprises an annular outer groove 32, 34 formed axially between the thread 22 and each gear teeth 24, 26. The thread 22 is situated axially between the grooves 32, 34. Each gear teeth 24, 26 is delimited axially by the associated groove 32, 34 and the corresponding journal 28, 30.

Referring again to FIG. 1, the nut 16 likewise comprises two inner gear teeth 44, 46 formed on the bore of the nut, axially on either side of the inner thread 18. Each gear teeth 44, 46 is respectively engaged with the gear teeth 24, 26 of the rollers for the synchronization thereof. The gear teeth 44, 46 are identical to one another. As will be described in more detail below, the root diameter of each gear teeth 44, 46 is less than the inside diameter of the thread 18. The gear teeth 44, 46 are formed on the nut 16 in a manner offset radially towards the inside of the mechanism 10 with respect to the thread 18.

The mechanism 10 also comprises two annular rings 48, 50 that are each mounted radially between the thread 14 of the screw and the nut 16 and axially offset towards the outside with respect to the associated gear teeth 44, 46. Each ring 48, 50 is mounted axially in the bore of the nut in a manner mounted freely in the circumferential direction with respect to the nut. Each ring 48, 50 comprise a plurality of cylindrical through-cavities (unreferenced) which are distributed regularly in the circumferential direction and inside which the journals 28, 30 of the rollers are accommodated. The rings 48, 50 support the rollers 20 and maintain the regular circumferential spacing thereof. The mechanism 10 also comprises retaining rings 52, 54 that are each mounted in a groove (unreferenced) formed in the bore of the nut and are intended to axially retain the corresponding ring 48, 50.

Referring again to FIG. 2, the gear teeth 24, 26 of each roller each comprise a plurality of radial teeth 60, 62 that are identical to one another and spaced apart from one other in a regular manner in the circumferential direction. The teeth 60, 62 extend axially. Since the gear teeth of each roller 20 are identical, only the gear teeth 24 will be described here.

As illustrated more clearly in FIG. 3, each tooth 60 of the gear teeth 24 comprises two opposite planar bearing flanks or faces 60a, 60b and a top 60c connecting the large-diameter ends of the faces. In the exemplary embodiment illustrated, the top 60c of each tooth is flat. The faces 60a, 60b delimit the associated tooth in the circumferential direction. The faces 60a, 60b of each tooth have a rectilinear profile in cross section. The faces 60a, 60b of each tooth are inclined with respect to a median plane P of the tooth passing through the axis 20a of the roller in two opposite directions. In the exemplary embodiment illustrated, the faces 60a, 60b of each tooth are symmetrical to one another when considering the median plane P. Each tooth 60 has a trapezoidal profile in cross section. The face 60a of one tooth is circumferentially opposite the face 60b of the immediately adjacent tooth, the faces being connected together by a concave bottom 60d. In the exemplary embodiment illustrated, the number of teeth 60 is equal to ten. Alternatively, a different, even or odd, number of teeth could be provided.

The outside diameter da of the gear teeth 24 corresponds to the circle passing through the tops 60c of the teeth. This is also referred to as the head diameter. This outside diameter da of the gear teeth 24 of each roller is less than the diameter D (FIG. 2) of the root of the thread 22.

With such a ratio between the outside diameter da of each gear teeth 24, 26 of each roller and the diameter D of the root of the thread 22 of the roller, no thread is formed on each of these gear teeth during operations of removing material that are carried out in order to machine the thread 22. This makes it possible to avoid premature wear to the synchronizing gear teeth 44, 46.

Moreover, the design of the teeth 60, 62 of the gear teeth 24, 26 of each roller having opposite planar faces makes it possible to be able to form these teeth by deformation in the radial direction of the material, using a radially acting tool, when considering the axis 20a of the roller. The gear teeth 24, 26 may advantageously be formed by rolling. The use of a radially acting tool to form the gear teeth 24, 26 of each roller is particularly advantageous inasmuch as it is not necessary to provide an axial clearance for the tool between each gear teeth 24, 26 of the roller and the associated thread 22.

Moreover, the planar shape of the faces of the teeth 60, 62 makes it possible to be able to obtain gear teeth 24, 26 that are suitable for a wide variety of pitches, even for relatively large pitches, on each of the rollers. By virtue of this planar shape of the faces of the teeth 60 and 62, it is possible to maintain an outside diameter da for the gear teeth 24, 26 of the roller that is less than the diameter D of the root of the thread 22, independently of the value of the pitch of the roller. This is not feasible with the conventional profile of roller gear teeth in the form of an involute of a circle for all possible pitches.

Figure 5:
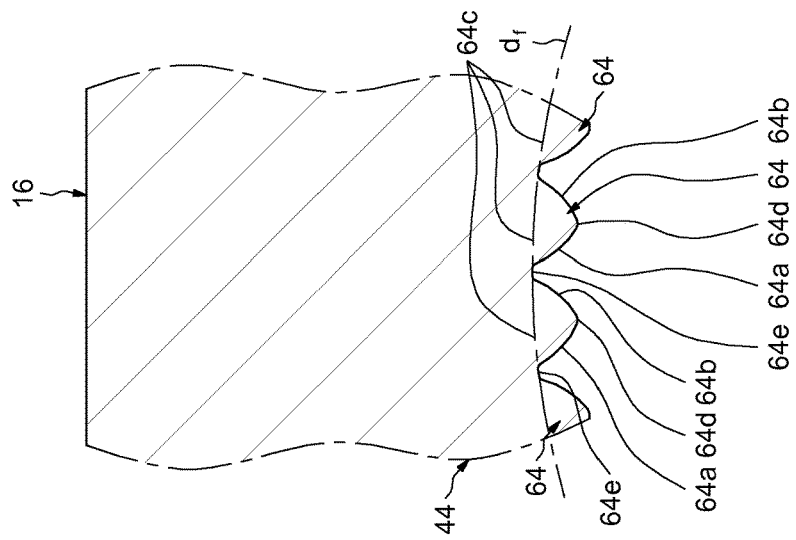
FIG. 5 is a view in partial section on the line V-V in FIG. 4.
Figure 4:
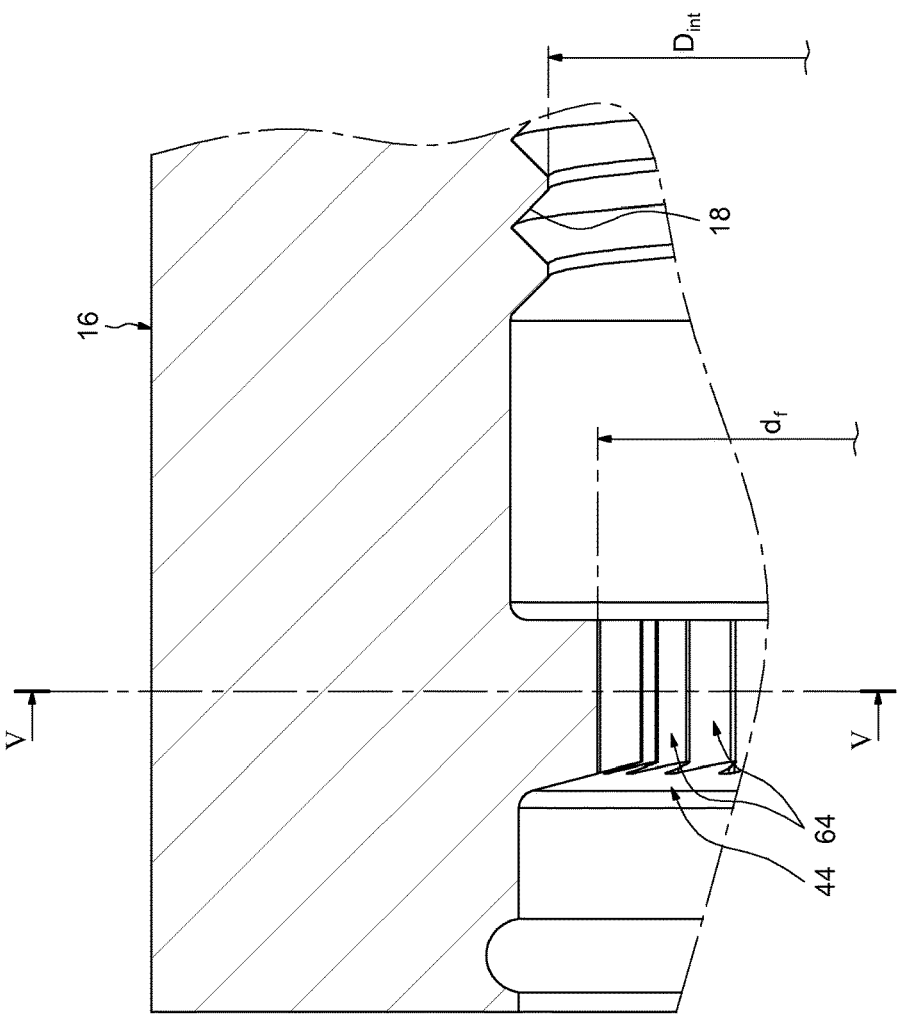
FIG. 4 is a detail view of the nut of the mechanism in FIG. 1.

As indicated above, the synchronizing gear teeth 44, 46 of the nut 18 are identical to one another. Only the gear teeth 44 will be described in detail below. As illustrated in FIGS. 4 and 5, the synchronizing gear teeth 44 comprises a plurality of radial teeth 64 that are identical to one another and spaced apart from one other in a regular manner in the circumferential direction. The teeth 64 extend axially and are directed radially towards the inside. Each tooth 64 comprises two opposite convex bearing flanks 64a, 64b, a root or base 64c, from which the flanks extend, and a top 64d connecting the large-diameter ends of the flanks. In the exemplary embodiment illustrated, the top 64d of each tooth is in the form of a radius. The flanks 64a, 64b delimit the associated tooth in the circumferential direction. Each of the flanks 64a, 64b of each tooth has a convex profile in cross section. Two successive teeth 64 are connected together in the circumferential direction by a bottom 64e.

In the exemplary embodiment illustrated, each flank 64a has a convex profile formed by a first hypocycloid in cross section and each flank 64b has a convex profile formed by a second hypocycloid. The first and second hypocycloids are symmetrical to one another when considering a median plane of each tooth 64 passing through the axis of the nut 16. As a variant, it may be possible to provide for the nut 16 teeth 64 that each has a convex profile formed by two symmetrical arcs of a circle in cross section, when considering a median plane of the tooth. In operation, the lateral flanks 64a, 64b of the teeth of the synchronizing gear teeth 44 of the nut engage by contact with the lateral faces 60a, 60b of the teeth of the gear teeth 24 of the rollers. In an identical manner, the flanks of convex shape of the teeth of the gear teeth 46 of the nut bear against the planar faces of the teeth of the gear teeth 26 of the rollers in the circumferential direction.

As indicated above, the root diameter df of the gear teeth 44 is less than the inside diameter Dint of the thread 18 of the nut. The root diameter df corresponds to the circle passing through the bases 64c of the teeth of the gear teeth 44 and the bottom 64e of each tooth gap. The inside diameter Dint of the thread 18 corresponds to the diameter of the crest of the thread. This is also referred to as the head diameter of the thread 18. The gear teeth 44 is offset radially towards the screw with respect to the thread 18. The gear teeth 44 is offset radially towards the inside with respect to the crests of the thread 18. The bases 64c of the teeth and the bottom 64e of each tooth gap are offset radially towards the inside with respect to the crests of the thread 18. The root diameter df of the gear teeth 44 is greater than or equal to the outside diameter da of the gear teeth of the rollers 20. The inside diameter Dint of the thread 18 is less than or equal to the diameter D of the root of the thread 22 of the rollers 20.

With a root diameter df for each gear teeth 44, 46 formed directly on the nut which is less than the inside diameter Dint of the thread 18 of the nut, it becomes possible to form these gear teeth in a single operation by axial broaching. The cutting of the gear teeth 44, 46 by way of an axially acting broaching tool is particularly advantageous inasmuch as the axial passage of the broaching tool inside the nut 16 makes it possible to form these gear teeth in a single pass, i.e. without axial return. The time for manufacturing the nut 16 is thus substantially shorter.

During the formation of the gear teeth 44, 46 by the broaching tool, there is no interference with the thread 18 of the nut, given the relative size of the root diameter df of each gear teeth and the inside diameter Dint of the thread as defined above. It is therefore not necessary to provide for the nut to be turned in order to be able to cut the two synchronizing gear teeth directly in the bore of the nut, as is the case for conventional planetary roller screw mechanisms in which the inside diameter of the thread of the nut is less than the root diameter of each synchronizing gear teeth formed on the nut. Moreover, with this method of gear cutting by broaching on either side of the nut 16 in a single pass, the teeth of the synchronizing gear teeth 44 are perfectly aligned in the circumferential direction with the teeth of the other gear teeth 46 formed in the bore of the nut.

The exemplary embodiment illustrated in FIG. 6, in which identical elements bear the same references, only differs from the first example described by way of the shape of the gear teeth 24, 26 of the rollers 20. In this example, the teeth 60, 62 of each roller each comprise a first flank or face that has a concave profile formed by a first hypocycloid in cross section and a second flank or face that has a concave profile formed by a second hypocycloid in cross section. The first and second hypocycloids are symmetrical to one another when considering a median plane of each tooth passing through the axis of the roller in question. As a variant, it may be possible to provide for each roller teeth 60, 62 that each have a concave profile formed by two symmetrical arcs of a circle in cross section, when considering a median plane of the tooth.

Figure 7:
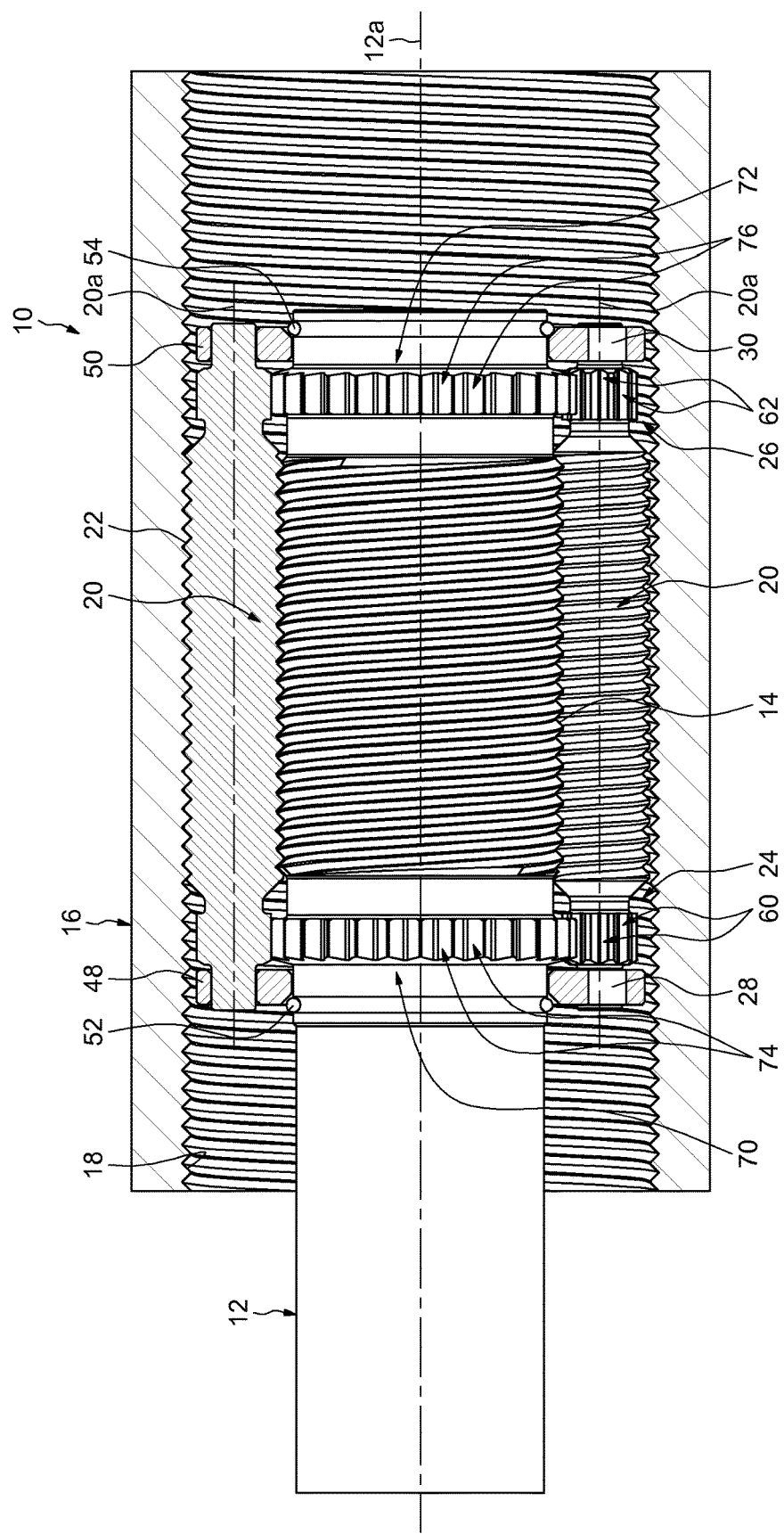
FIG. 7 is a view in axial section of a roller screw mechanism according to a third exemplary embodiment of the invention.

In the first two examples illustrated, the present invention was illustrated on the basis of a planetary roller screw mechanism. The exemplary embodiment illustrated in FIG. 7, in which identical elements bear the same references, only differs in that the mechanism 10 is of the inverted roller screw type. The design of the rollers 20 is strictly identical to that of the first exemplary embodiment described above.

The screw 12 comprises two outer synchronizing gear teeth 70, 72 formed on the outer surface of the screw. The gear teeth 70, 72 are identical to one another and disposed axially on either side of the thread 14. The gear teeth 70, 72 is respectively engaged with the gear teeth 24, 26 of the rollers for the synchronization thereof. The gear teeth 70, 72 are formed on the screw 12 in a manner offset radially towards the outside with respect to the thread 14.

Each gear teeth 70, 72 comprises a plurality of radial teeth 74, 76 that are identical to one another and spaced apart from one another in a regular manner in the circumferential direction. The teeth 74, 76 extend axially and are directed radially towards the outside. Each tooth 74, 76 comprises two opposite convex bearing flanks and a top connecting the large-diameter ends of the flanks. Each of the flanks of each tooth has a convex profile in cross section. One of the flanks of each tooth may have a convex profile formed by a first epicycloid in cross section and the other flank may have a convex profile formed by a second epicycloid, it being possible for the first and second epicycloids to be symmetrical to one another when considering a median plane of the tooth. As a variant, it may be possible to provide teeth 74, 76 that each has a convex profile formed by two symmetrical arcs of a circle in cross section, when considering a median plane of the tooth.

Figure 8:
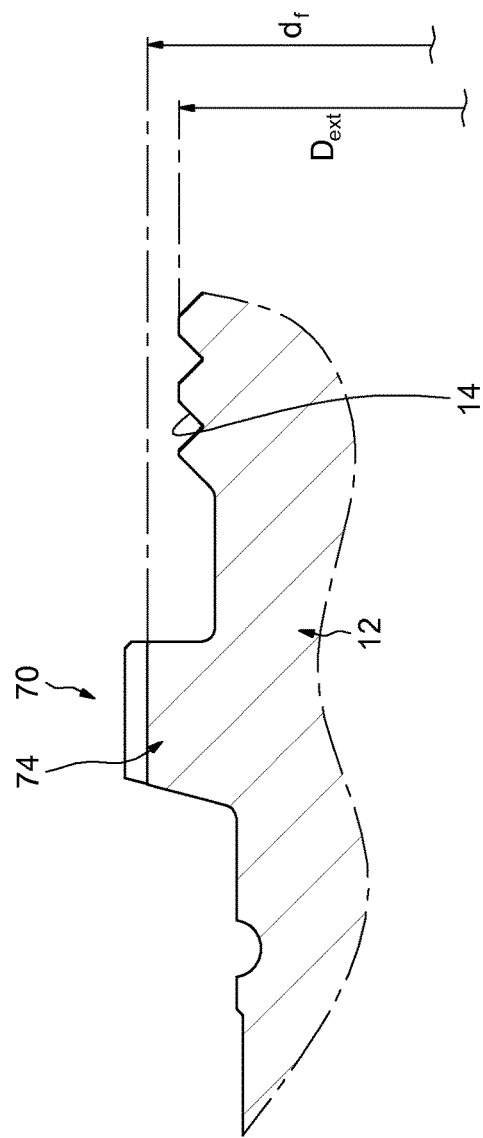
FIG. 8 is a detail view in section of the screw of the mechanism in FIG. 7.

As illustrated more clearly in FIG. 8, the root diameter df of the gear teeth 70 is greater than the outside diameter Dext of the thread 14 of the screw. The root diameter df corresponds to the circle passing through the bases of the teeth 74 of the gear teeth and the bottom of each tooth gap. The outside diameter Dext of the thread 14 corresponds to the diameter of the crest of the thread. This is also referred to as the head diameter of the thread 14. The gear teeth 70 is offset radially towards the nut with respect to the thread 14. The gear teeth 70 is offset radially towards the outside with respect to the crests of the thread 14. The bases of the teeth 70 and the bottom of each tooth gap are offset radially towards the outside with respect to the crests of the thread 14. The root diameter df is greater than or equal to the outside diameter of the gear teeth of the rollers 20.

With a root diameter df for each gear teeth 70, 72 of the screw which is greater than the outside diameter Dext of the thread 14, it becomes possible to form these gear teeth in a single operation by axial broaching. The cutting of the gear teeth 70, 72 on the screw 12 can be carried out in a single pass and without radial interference with the thread 14. The time for manufacturing the screw 12 is thus substantially shorter compared with a conventional inverted roller screw mechanism in which the outside diameter of the thread of the screw is greater than the root diameter of each synchronizing gear teeth. Moreover, with such axial broaching on either side of the screw 12 in a single operation, the teeth of the synchronizing gear teeth 70 are perfectly aligned in the circumferential direction with the teeth of the other gear teeth 72 formed on the outer surface of the screw.

Referring again to FIG. 7, in this exemplary embodiment, the rings 48, 50 are each mounted in this case radially between a non-threaded part of the outer surface of the screw 12 and the thread 18 of the nut. The retaining rings 52, 54 in this case have a smaller radial size and are each mounted in a groove (unreferenced) formed in the associated non-threaded part of the screw 12.

Figure 9:
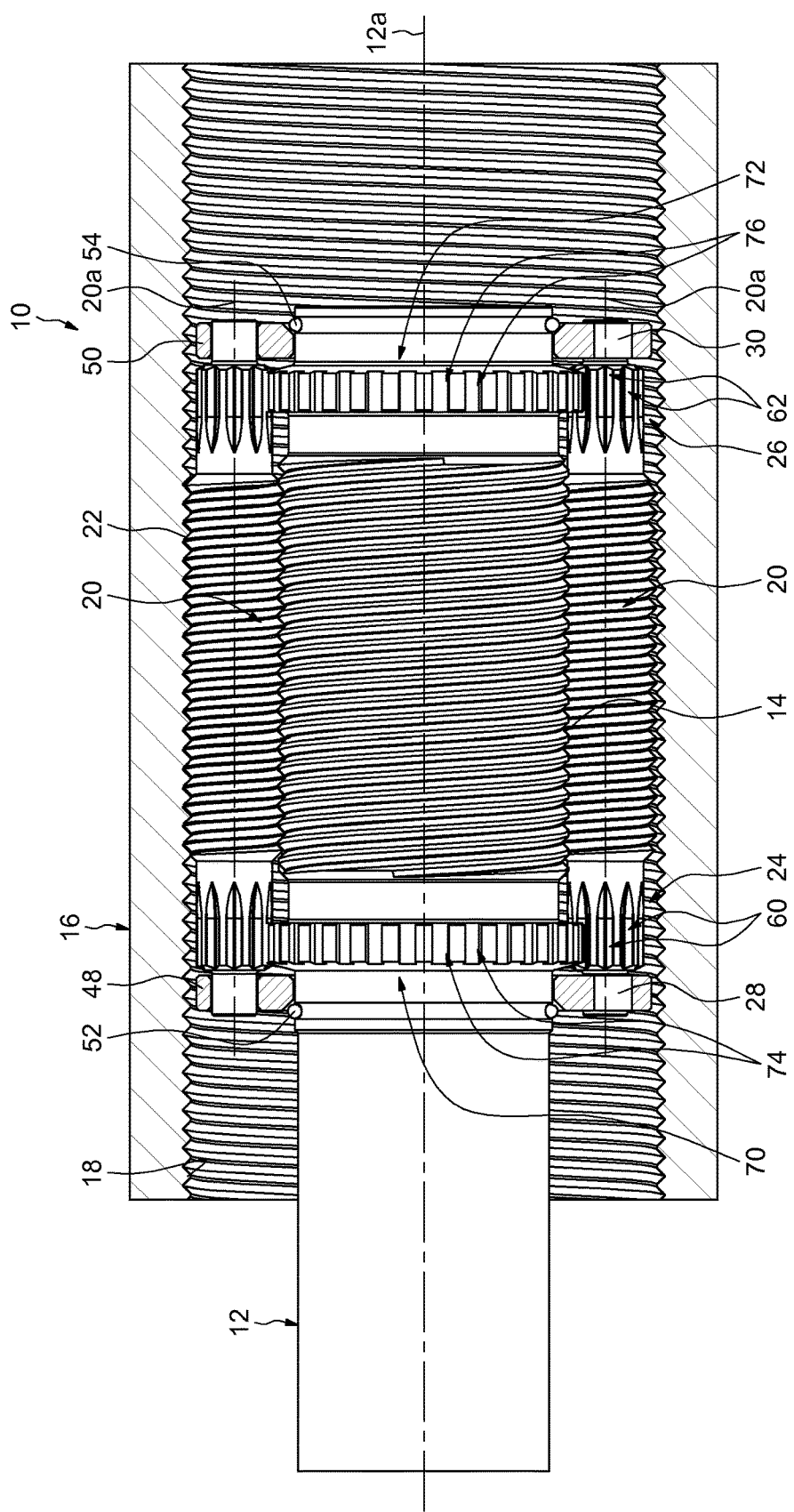
FIG. 9 is a view in axial section of a roller screw mechanism according to a fourth exemplary embodiment of the invention.

The exemplary embodiment illustrated in FIG. 9, in which identical elements bear the same references, only differs from the above-described example by way of the shape of the gear teeth 24, 26 of the rollers 20. In this example, the teeth 60, 62 of each roller each comprise a first flank or face that has a concave profile formed by a first hypocycloid in cross section and a second flank or face that has a concave profile formed by a second hypocycloid in cross section. The first and second hypocycloids are symmetrical to one another when considering a median plane of each tooth passing through the axis of the roller in question. As a variant, it may be possible to provide for each roller teeth 60, 62 that each have a concave profile formed by two symmetrical arcs of a circle in cross section, when considering a median plane of the tooth.

The roller screw mechanism comprises synchronizing gear teeth formed on the nut, or on the screw, such that the nut and the screw respectively constitute elements that are fixed and movable axially with respect to the rollers, or vice versa, during a rotation of the screw relative to the nut. Each synchronizing gear teeth formed on the fixed element is radially offset towards the movable element with respect to the thread of the fixed element. When the mechanism is of the planetary roller screw type, the element that is fixed axially with respect to the rollers is the nut and the element that is movable axially is the screw. By contrast, when the mechanism is of the inverted roller screw type, the element that is fixed axially with respect to the rollers is the screw and the element that is movable axially is the nut.

What is claimed is:

1. A roller screw mechanism comprising:
    a screw having an outer thread;
    a nut disposed coaxially around the screw, the nut comprising an inner thread, and
    a plurality of rollers disposed radially between the screw and the nut and having an outer thread engaged with the outer thread of the screw and with the inner thread of the nut and having two sets of outer gear teeth; and
    two sets of synchronizing gear teeth formed on the nut, each of the two sets of synchronizing gear teeth being engaged with one of the two sets of outer gear teeth of the rollers,
    wherein a root diameter of each set of synchronizing gear teeth is less than an inside diameter of the inner thread of the nut, and wherein the nut is unitary and includes an inner surface and wherein the inner thread is formed in the inner surface and wherein the two sets of outer gear teeth of the plurality of the rollers do not engage the screw.

2. The mechanism according to claim 1, wherein each tooth of the two sets of synchronizing gear teeth further comprises flanks that have a convex profile in cross section.

3. The mechanism according to claim 1, wherein each tooth of the two sets of synchronizing gear teeth further comprises:
    a first flank that has a convex profile formed by a first hypocycloid in cross section, and
    a second flank that has a convex profile formed by a second hypocycloid in cross section.

4. The mechanism according to claim 1, wherein each tooth of the two sets of synchronizing gear teeth comprises two flanks, each flank having a convex profile formed by an arc of a circle in cross section.

5. The mechanism according to claim 1, each tooth of the two sets of outer gear teeth of the rollers further comprising planar faces.

6. The mechanism according to claim 1, each tooth of the two sets of outer gear teeth of the rollers further comprising faces having a concave profile in cross section.

7. An actuating cylinder comprising a driving feature for driving in rotation and a roller screw mechanism according to claim 1, the screw of the roller screw mechanism being coupled to the driving feature.

8. A roller screw mechanism comprising:
    a screw having an outer thread;
    a unitary nut disposed coaxially around the screw, the nut having an inner surface and an inner thread formed in the inner surface, and
    a plurality of rollers disposed radially between the screw and the nut, each of the plurality of rollers having an outer thread engaged with the outer thread of the screw and with the inner thread of the nut, each of the plurality of rollers further including a first set of outer gear teeth and a second set of outer gear teeth; and
    a first set of synchronizing gear teeth formed in the inner surface of the nut on a first side of the inner thread and a second set of synchronizing gear teeth formed in the inner surface of the nut on a second side of the inner thread, the first set of synchronizing gear teeth engaging the first set of outer gear teeth of the plurality of rollers and the second set of synchronizing gear teeth engaging the second set of outer gear teeth of the plurality of rollers,
wherein a root diameter of the first and second sets of synchronizing gear teeth is less than an inside diameter of the inner thread of the nut, and,
wherein the first and second sets of outer gear teeth of the plurality of the rollers do not engage the screw.

* * * * *